(12) United States Patent
Eyler

(10) Patent No.: US 10,586,035 B2
(45) Date of Patent: *Mar. 10, 2020

(54) SYSTEM FOR CONTROLLING ACCESS TO AN ACCOUNT

(71) Applicant: Sling Media Inc., Foster City, CA (US)

(72) Inventor: David Randolph Eyler, San Francisco, CA (US)

(73) Assignee: Sling Media LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,993

(22) Filed: Jul. 17, 2017

(65) Prior Publication Data
US 2017/0316199 A1 Nov. 2, 2017

Related U.S. Application Data

(63) Continuation of application No. 13/890,750, filed on May 9, 2013, now Pat. No. 9,721,084.
(Continued)

(51) Int. Cl.
*G06F 21/00* (2013.01)
*G06F 21/44* (2013.01)
(Continued)

(52) U.S. Cl.
CPC ............ *G06F 21/44* (2013.01); *G06F 21/41* (2013.01); *H04L 63/0815* (2013.01);
(Continued)

(58) Field of Classification Search
CPC .......... G01N 21/6489; G01N 21/6456; G01N 21/9501; G01N 2201/062; G01N 2201/646; G01R 31/2656
See application file for complete search history.

(56) References Cited

U.S. PATENT DOCUMENTS 8,108,316 B1 * 1/2012 Shapiro ................ G06Q 20/12
705/64
2009/0228929 A1 9/2009 Cass
(Continued)

FOREIGN PATENT DOCUMENTS

GB 2433687 A * 6/2007 ............. H04N 5/782

OTHER PUBLICATIONS

European Patent Office, International Search Report and Written Opinion, dated Apr. 22, 2014 for International Application No. PCT/US2013/076105.
(Continued)

*Primary Examiner* — Beemnet W Dada
(74) *Attorney, Agent, or Firm* — Lorenz & Kopf LLP (57) ABSTRACT

An account management server, a communication device and a service device are provided for managing access to an account. The account management server, for example, includes, but is not limited to, a storage device configured to store identifying information for each of a plurality of service devices and configured to store an account associated with each of the plurality of service devices, and a processor communicatively coupled to the storage device, wherein the processor is configured to: receive identifying information from a communication device; identify at least one service device whose stored identifying information matches the received identifying information; and grant management access to the account associated with the identified at least one service device to the communication device.

15 Claims, 4 Drawing Sheets

Related U.S. Application Data (60) Provisional application No. 61/746,665, filed on Dec. 28, 2012.

(51) Int. Cl.
| | | |
|---|---|---|
| *G06F 21/41* | (2013.01) | |
| *H04L 29/06* | (2006.01) | |
| *H04N 21/258* | (2011.01) | |
| *H04N 21/41* | (2011.01) | |
| *H04N 21/414* | (2011.01) | |
| *H04N 21/426* | (2011.01) | |
| *H04N 21/475* | (2011.01) | |
| *H04N 21/658* | (2011.01) | |

(52) U.S. Cl.
CPC ... *H04N 21/25866* (2013.01); *H04N 21/4108* (2013.01); *H04N 21/41407* (2013.01); *H04N 21/42684* (2013.01); *H04N 21/4751* (2013.01); *H04N 21/6582* (2013.01)

(56) References Cited

U.S. PATENT DOCUMENTS

| | | | |
|---|---|---|---|
| 2012/0155838 A1 | 6/2012 | Gerhards et al. | |
| 2012/0215830 A1* | 8/2012 | Anguiano | G06F 8/65 709/203 |

OTHER PUBLICATIONS

The International Bureau of WIPO, International Preliminary Report on Patentability for International Application No. PCT/US2013/076105 dated Jul. 9, 2015.

\* cited by examiner

SYSTEM FOR CONTROLLING ACCESS TO AN ACCOUNT

CROSS-REFERENCES TO RELATED APPLICATIONS

This Application claims priority to U.S. application Ser. No. 13/890,750 filed May 9, 2013 which claims priority to U.S. Provisional Application Ser. No. 61/746,665, filed Dec. 28, 2012.

TECHNICAL FIELD

The following relates to systems for controlling access to an account.

BACKGROUND

Online account management has become increasingly prevalent in recent years. However, with each new account, a user must remember a new username and password. For security purposes users often use a different username and/or password for each account so that if one account is compromised the remainder remain safe. In some instances, even if a user wished to use the same username or password, the username may be taken by another user or the online account system may have different password standards, forcing the user to use a different username or password. Keeping track of all the usernames and passwords can be difficult. Furthermore, setting up an online account can be difficult or confusing to some users.

SUMMARY

In accordance with one embodiment, an account management server is provided. The account management server includes, but is not limited to a storage device configured to store identifying information for each of a plurality of service devices and configured to store an account associated with each of the plurality of service devices, and a processor communicatively coupled to the storage device, wherein the processor is configured to receive identifying information from a communication device, identify at least one service device whose stored identifying information matches the received identifying information, and grant management access to the account associated with the identified at least one service device to the communication device.

In accordance with another embodiment, for example a service device is provided. The service device may include, but is not limited to a storage device configured to store a unique identifier associated with the service device, a communication system configured to communicate over a local area network, and a processor communicatively coupled to the storage device and the communications system, wherein the processor is configured to determine an internet protocol address of the local area network, and transmit the internet protocol address to an account management server.

In accordance with another embodiment, for example a communication device is provided. The communication device may include, but is not limited to a storage device, a communication system, and a processor communicatively coupled to the storage device and the communications system, wherein the processor is configured to receive, via the communication system, identifying information associated with a service device, store the identifying information for the service device in the storage device, and request access to an account on an account management server by transmitting the identifying information to the account management server.

DESCRIPTION OF THE DRAWING FIGURES

Exemplary embodiments will hereinafter be described in conjunction with the following drawing figures, wherein like numerals denote like elements.

DETAILED DESCRIPTION

According to various exemplary embodiments, a system for managing access to an online account for a service is provided. As discussed in further detail below, an account management server, a service device and a communication device are provided and are configured to interact to securely create an online account and link the account to a service with little to no action required by the account user.

Figure 1:
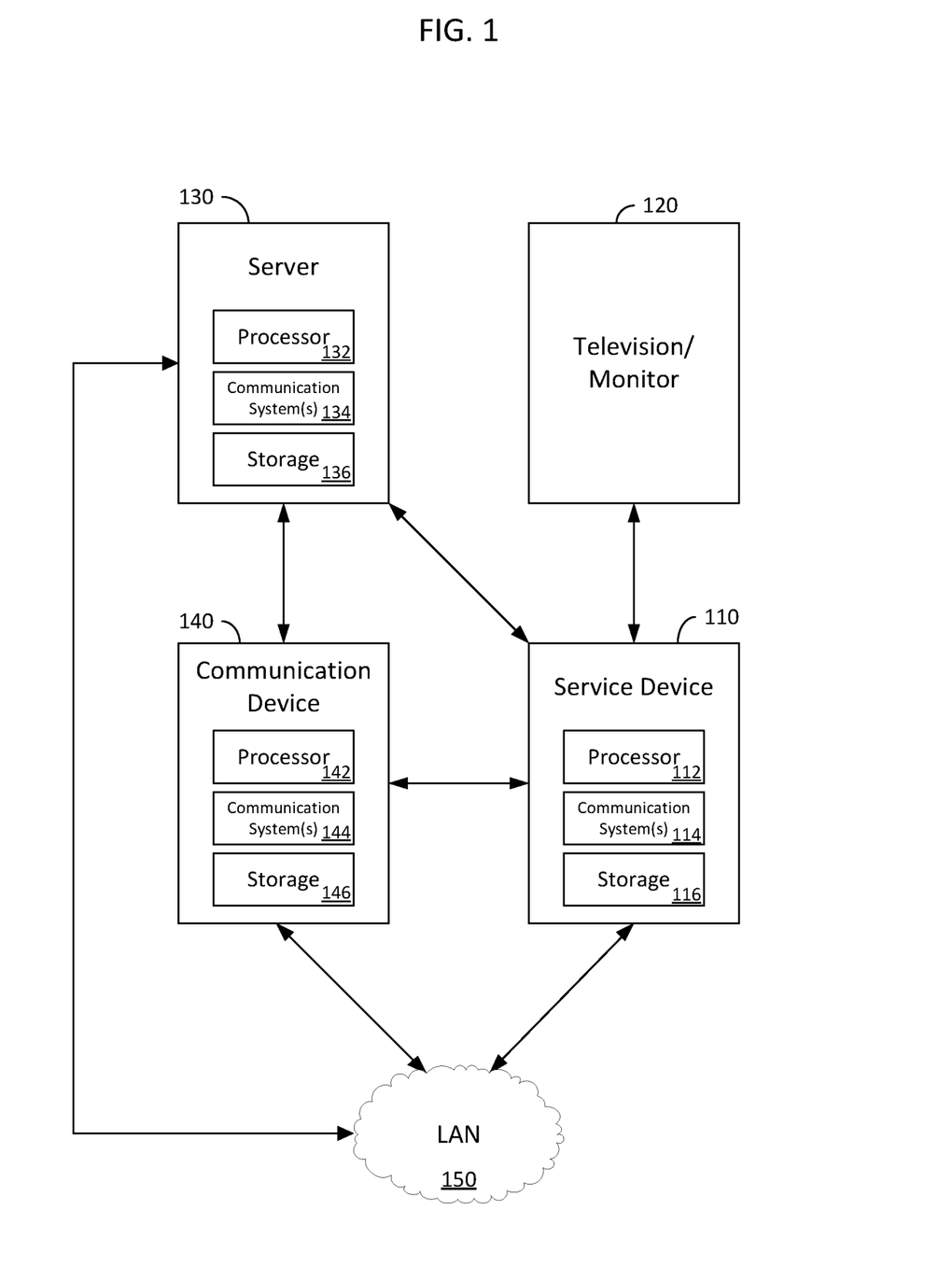
FIG. 1 is a block diagram of a system 100 for controlling access to an account, in accordance with an embodiment.

FIG. 1 is a block diagram of a system 100 for controlling access to an account, in accordance with an embodiment. The system 100 includes a service device 110. The service device 110 includes a processor 112. The processor 112 may be a central processing unit (CPU), a graphical processing unit (GPU), a physics processing unit (PPU), an application specific integrated circuit (ASIC), a microprocessor, a programmable logic controller (PLC), a field programmable gate array (FPGA), or any other type of logic device. The processor 112 is communicatively coupled to one or more communication systems 114. The communication system(s) 114 may include, but are not limited to, a Wi-Fi communication system, a network interface communication system, a cellular communication system, a radio frequency identification (RFID) communication system, a ZigBee communication system, a personal area network (PAN) (e.g., Bluetooth) communication system, a near field communication (NFC) system, or any combination thereof. The processor 112 is also communicatively coupled to a storage device 116. The storage device 116 may be a local memory such as a hard disk drive, flash drive, or any other local non-volatile memory, or the storage device may be a remote non-volatile memory, such as a cloud storage device, accessible via one or more of the communication systems 114.

The service device 110 may be any device associated with one or more services, including, but not limited to, television, internet, or phone. In one embodiment, for example, the service device 110 may be a set-top box (STB) which receives a television signal via a satellite or cable connection (not illustrated) to be displayed on a television or monitor 120. In another embodiment, for example, the service device 110 may be a modem, such as a cable modem, digital subscriber line (DSL) modem, satellite modem, or any other internet enabling device. In still other embodiments, for example, the service device may be a voice-over-internet protocol (VoIP) system enabling VoIP phone calls.

As discussed above, the service device 110 is associated with an account from the service provider (i.e., cable company, satellite television company, internet provider, etc.). The account can be managed through communication with a server 130. The server 130 includes a processor 132. The processor 132 may be a central processing unit (CPU), a graphical processing unit (GPU), a physics processing unit (PPU), an application specific integrated circuit (ASIC), a microprocessor, a programmable logic controller (PLC), a field programmable gate array (FPGA), or any other type of logic device. The processor 132 is communicatively coupled to one or more communication systems 134. The communication system(s) 134 may include, but are not limited to, a Wi-Fi communication system, a network interface communication system, a cellular communication system, or any combination thereof. The processor 132 is also communicatively coupled to a storage device 136. The storage device 136 may be a local memory such as a hard disk drive, a flash drive, or any other local non-volatile memory, or the storage device may be a remote non-volatile memory, such as a cloud storage device, accessible via one or more of the communication systems 134.

The management interactions with the server may vary depending upon the type of service device 110. Some exemplary management interactions include, but are not limited to, paying a bill, viewing usage figures, setting a recording, changing services, ordering a pay-per-view movie or event, or any other online service.

The system 100 further includes a communication device 140. The communication device 140 includes a processor 142. The processor 142 may be a central processing unit (CPU), a graphical processing unit (GPU), a physics processing unit (PPU), an application specific integrated circuit (ASIC), a microprocessor, a programmable logic controller (PLC), a field programmable gate array (FPGA), or any other type of logic device. The processor 142 is communicatively coupled to one or more communication systems 144. The communication system(s) 144 may include, but are not limited to, a Wi-Fi communication system, a network interface communication system, a cellular communication system, a radio frequency identification (RFID) communication system, a ZigBee communication system, a Bluetooth communication system, a near field communication (NFC) system, or any combination thereof. The processor 142 is also communicatively coupled to a storage device 146. The storage device 146 may be a local memory such as a hard disk drive, a flash drive, or any other local non-volatile memory, or the storage device may be a remote non-volatile memory, such as a cloud storage device, accessible via one or more of the communication systems 144.

The communication device 140 can be used by an owner of the account to manage the service account on the server 130. The communication device 140 may be a cellular phone, a tablet, a personal digital assistant (PDA), a personal computer, a laptop computer or any other electronic device. In one embodiment, for example, the communication device 140 may utilize one or more of a cellular connection, such as a 3G, long term evolution (LTE), 4G, a satellite connection, or the like, to communicate with the server. In another embodiment, for example, the communication device 140 may communicate with the server 130 through a local area network (LAN) 150, a Wi-Fi network, or the like.

In one embodiment, for example, the communication device 140 may communicate with the server 130 via an application. The application for managing the account on the server 130 can be downloaded, for example, onto the communication device 140. The application (otherwise known as an "App") may be an Apple IOS App, an Apple Mac OS App, an Android App, a Chrome App, a Windows App, a Windows Mobile App, a Linux App, a Unix App, or an App for any other operating system or device. In this embodiment, for example, account linking data may be stored on a storage device 146 in communication with the communication device 140, as discussed in further detail below. In another embodiment, for example, the user may manage the account from an internet browser such as Internet Explorer, Safari, Chrome, Firefox or the like running on the communication device 140. In this embodiment, for example, a cookie may be stored on the communication device 140 to store account linking data, as discussed in further detail below.

Figure 2:
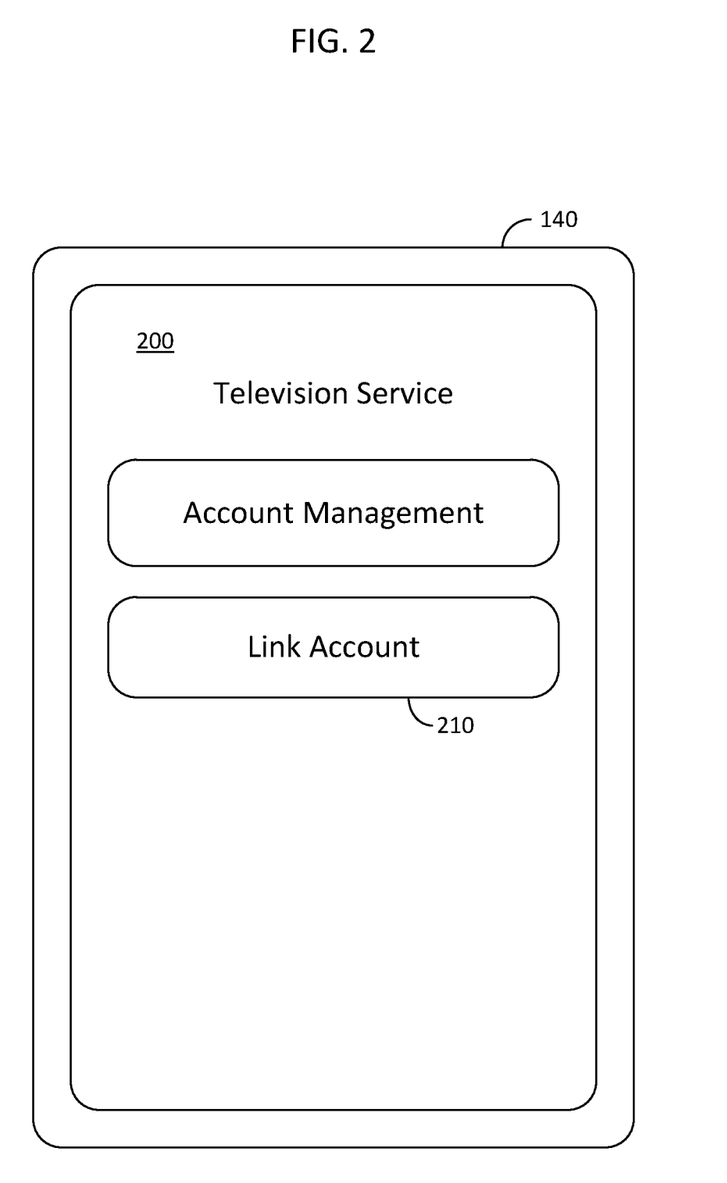
FIG. 2 illustrates an exemplary communication device 140, in accordance with an embodiment.

FIG. 2 illustrates an exemplary communication device 140, in accordance with an embodiment. The communication device 140, illustrated herein as cellular phone, include an application 200 for managing an account. In one embodiment, for example, the application 200 includes an option to link the application to the users account. As discussed above, the linking process preferably involves little to no interaction from the user.

In one embodiment, for example, the account linking process may be completed merely by a user selecting a link account interface 210 in the application. The application may be downloaded onto the communication device via the communication system 144. However, in other embodiments, for example, the account linking process may be accomplished without the user selecting the link account interface 210, as discussed in further detail below. In either case, the account linking is accomplished without the user having to create an online account to manage the service and without the user having to create a username and password for the account.

The account linking process may be done in a variety of ways. In one embodiment, for example, the application 200 may link to an account if the communication device 140 and the service device 110 are on the same LAN 150. In this embodiment, for example, the application 200 may determine an internet protocol (IP) address of the LAN 150 and store an indication of the IP address as a token or a cookie in the communication device 140. The service device 110 may be configured to transmit the IP address of the LAN 150 along with identifying information to the server 130 which may then be stored on the storage device 136 in communication with the server 130. The identifying information may include, but is not limited to, a unique identifier for the service device 110. If the service device 110 is not associated with an account, the server 130 creates the account and associates the account with the service device 110. Accordingly, when the user attempts to manage the account on the server 130 via the application 200, the application 200 may transmit the token to the server 130. The server 130 then compares the IP address stored in the token with the IP address of the service device 110 corresponding to the identifying information. If the IP address in the token matches the IP address of the service device 110, the server 130 grants access to the communication device the manage the account associated with the identified service device. Because the IP address is stored in a token or in a cookie, the communication device 140 does not always have to be on the same LAN 150 as the service device 110. For example, if the communication device 140 is a cellular phone, the user may link the cellular phone with the service device once when the cellular phone and the service device are on the same LAN 150. Thereafter, because the IP address of the LAN is stored in a token or cookie, the user can manage the account on the cellular phone wherever the phone is, so long as the phone has a data connection, such as a 3G connection, a 4G connection, a Wi-Fi connection (whether the Wi-Fi connection is connected to the same LAN as the service device or to any other Wi-Fi hotspot) or any other type of data connection.

In one embodiment, for example, if the service device 110 is coupled to the LAN 150 via a Wi-Fi communication interface, the application or internet browser may only store the IP address of the LAN if the communication device 140 detects that the Wi-Fi network is a secure network. One benefit of this embodiment, for example, is that the application or internet browser would only link to the account when the communication device 140 is authorized to connect to the Wi-Fi network.

In another embodiment, for example, if the service device 110 and communication device 140 are on the same LAN 150 when the user interacts with the link account interface 210, the service device 110 may send identifying information to the communication device over the LAN 150. The identifying information may include, for example, a unique identifier of the service device. The identifying information may be stored, for example, in a token or cookie on the communication device 140. Accordingly, when the user attempts to manage the account on the server 130 via the application 200, the application 200 may transmit the token to the server 130. The server 130 then locates an account associated with the identifying information of the service device and grants access to the account.

In another embodiment, for example, the account linking may be accomplished via a near field communication system (NFC) or a radio frequency identification (RFID) system. In this embodiment, for example, when the user interacts with the link account interface 210, the user may be instructed to touch the communication device 140 to the service device 110 or bring the communication device 140 into close approximation with the service device 110. When the communication device 140 establishes a connection with the service device 110 via the NFC system or RFID system, the service device 110 may transmit identifying information to the communication device. As discussed above, the identifying information may be saved in a token or cookie on the communication device 140 and be used to access account management features on the server 130.

In yet another embodiment, for example, the account linking may be accomplished via a Bluetooth connection. In this embodiment, for example, when the user interacts with the link account interface 210, the user may be instructed to pair the communication device 140 with the service device 110 via any of the Bluetooth pairing protocols. When the communication device 140 establishes a connection with the service device 110, the service device 110 may transmit identifying information to the communication device. As discussed above, the identifying information may be saved in a token or cookie on the communication device 140 and be used to access account management features on the server 130.

In yet another embodiment, for example, the account linking may be accomplished via a ZigBee connection. In this embodiment, for example, when the user interacts with the link account interface 210, a ZigBee connection may be established between the communication device 140 and the service device 110. When the connection is established, the service device 110 may transmit identifying information to the communication device. As discussed above, the identifying information may be saved in a token or cookie on the communication device 140 and be used to access account management features on the server 130.

In another embodiment, for example, the service device 110 may collect both the IP address of the LAN 150 and the identifying information of the service device 110 via any of the methods discussed herein. In this embodiment, when the service device 110 attempts to communicate with the server 130, the service device 110 would transmit both the IP address of the LAN 150 and the identifying information of the service device 110. As discussed above, the service device 110 may transmit the IP address of the LAN 150 to the server 130 at an earlier time. Accordingly, the server 130 may grant access to account management features to the communication device 140 only if the transmitted IP address corresponds to the identifying information of the service device 110. One benefit of this embodiment, for example, is that since the IP address and identifying information of the service device 110 transmitted by the communication device 140 has to match the IP address and identifying information of the service device 110 transmitted by the service device 110, an unauthorized user would have to discover both to access the account, increasing the security of the account access system.

In yet another embodiment, for example, when the service device 110 and communication device 140 establish a connection via any of the methods discussed herein, the communication device 140 may transmit a unique identifier associated with the communication device 140 to the service device 110. In this embodiment, for example, the service device 110 may transmit the unique identifier associated with the communication device 140 to the server 130 via the communication system 114. Accordingly, when the communication device 140 attempts to access the account on the server 130, the communication device 140 may transmit the unique identifier associated with the communication device 140 to the server 130. The server 130, via its processor 132, may then determine if the unique identifier transmitted by the communication device 140 matches the unique identifier transmitted by the service device 110. If the unique identifiers match, the server 130 may grant management access to the communication device 140. In this embodiment, for example, the service device 110 may allow the user to manage which communication devices 140 can access the associated account. If the service device is a set-top box, for example, the set-top box may output a menu to the television or monitor 120. A user, through a remote control or other input device (not illustrated) could then manage which communication devices are granted management access on the server 130.

Figure 3:
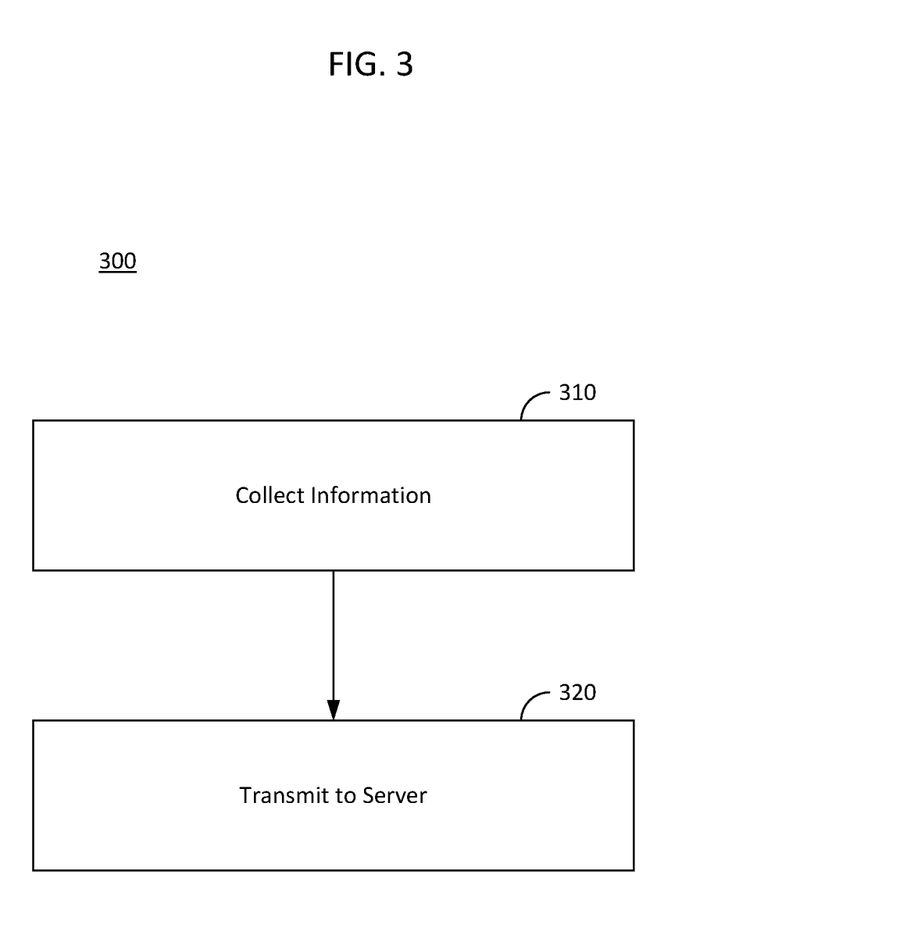
FIG. 3 is a flow chart illustrating an exemplary method for setting up the account access, in accordance with an embodiment.

FIG. 3 is a flow chart illustrating an exemplary method 300 for setting up the account access, in accordance with an embodiment. The method begins when the service device collects identifying information. (Step 310). As discussed above, the service device 110 may collect an IP address of a LAN 150 the service device is connected to. The identifying information may also include a unique identifier of the service device 110. In another embodiment, for example, the service device may collect identifying information from a communication device 140, such as a unique identifier of the communication device, via a communication system 114. The service device 110 then transmits the identifying information to an account management server to set up the account.

Figure 4:
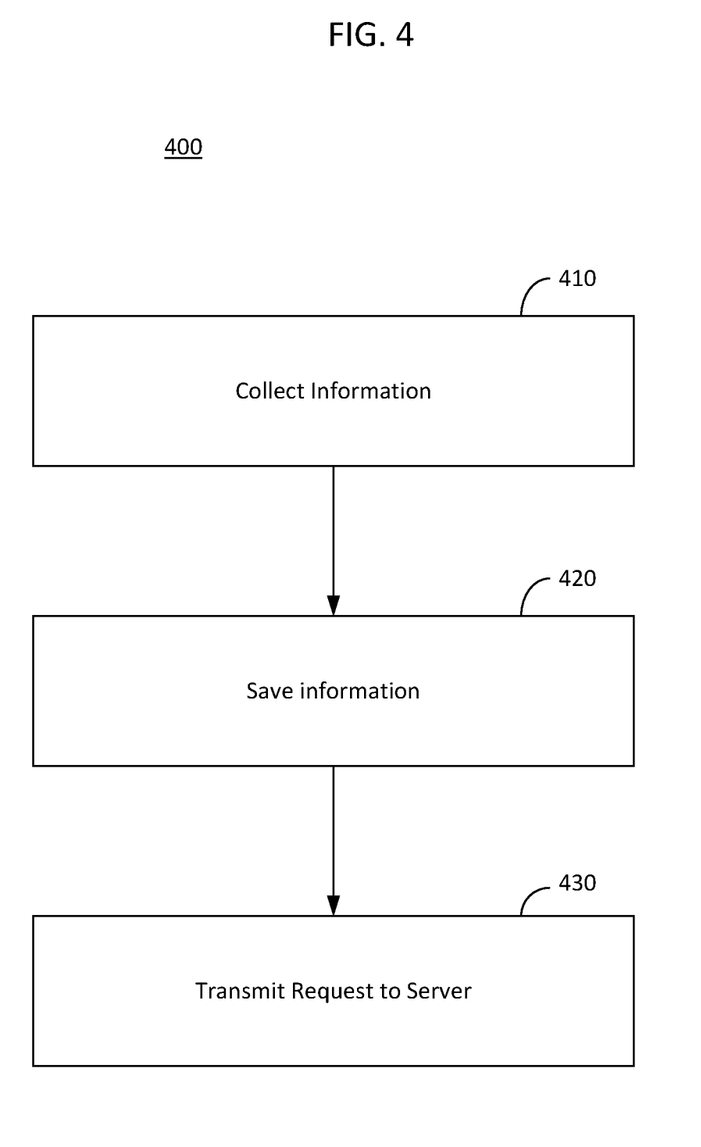
FIG. 4 is a flow chart illustrating an exemplary method for accessing an account, in accordance with an embodiment.

FIG. 4 is a flow chart illustrating an exemplary method 400 for accessing an account, in accordance with an embodiment. The method begins when the communication device 140 collects identifying information. (Step 410). As discussed above, the communication device 140 may collect an IP address of a LAN 150 the communication device is connected to. In another embodiment, for example, the communication device 140 may collect identifying information from a service device 110, such as a unique identifier of the service device 110, via a communication system 144. The communication device 140 then stores the identifying information in a storage 144. (Step 410). As discussed above, this allows the communication device to link to the account even if, for example, the communication device is no longer on the same LAN as the service device. The communication device 140 then transmits the identifying information to an account management server 130 when the communication device is requesting access to the account. (Step 420). As discussed above, if the identifying information transmitted by the communication device 140 matches the identifying information transmitted by the service device, the account management server grants access to the respective account to the communication device.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An account management server, comprising:
   a storage device; and
   a processor communicatively coupled to the storage device, wherein the processor is configured to:
      receive, from an electronic device, identifying information associated with the electronic device;
      set up a new account associated with the electronic device without substantial user input upon receipt of the identifying information associated with the electronic device when no existing account is associated with the identifying information and storing the new account in the storage device;
      associate the electronic device with the existing account stored in the storage device when the existing account is associated with the identifying information;
      receive the identifying information from a communication device, wherein the communication device is a device different from the electronic device;
      identify at least one electronic device whose stored identifying information matches the received identifying information; and
      grant a user of the communication device management access to the account associated with the identified at least one electronic device.

2. The account management server of claim 1, wherein the identifying information is an internet protocol address.

3. The account management server of claim 2, wherein the processor is further configured to receive an internet protocol address and a unique identifier the electronic device from the electronic device and further configured to store the internet protocol address and the unique identifier in the storage device.

4. The account management server of claim 1, wherein the identifying information is a unique identifier associated with the electronic device.

5. The account management server of claim 1, wherein the identifying information includes a unique identifier associated with the electronic device and an internet protocol address.

6. An electronic device, comprising:
   a storage device configured to store a unique identifier associated with the electronic device;
   a communication system; and
   a processor communicatively coupled to the storage device and the communications system, wherein the processor is configured to:
      receive a unique identifier associated with a communication device, the communication device being a different device than the electronic device, and
      transmit the unique identifier associated with the communication device and the unique identifier associated with the electronic device to an account management server configured to generate a new account on the account management server associated with the electronic device without substantial user input and upon receipt of the unique identifier associated with the communication device and the unique identifier associated with the electronic device and grant management access to the new account associated with the electronic device on the account management server to a user of the communication device upon receipt of the unique identifier associated with the communication device and the unique identifier associated with the electronic device from the communication device.

7. The electronic device of claim 6, further comprising:
   a near field communication system communicatively coupled to the processor,
   wherein the processor is further configured to:
      detect an establishment of a connection between the electronic device and a communication device via the near field communication system; and
      receive, via the near field communication system, the unique identifier associated with the communication device.

8. The electronic device of claim 6, further comprising:
   a personal area network (PAN) communication system communicatively coupled to the processor,
   wherein the processor is further configured to:
      detect an establishment of a connection between the electronic device and a communication device via the PAN communication system; and
      receive, via the PAN communication system, the unique identifier associated with the communication device.

9. The electronic device of claim 6, further comprising:
   a radio-frequency identification communication system communicatively coupled to the processor,
   wherein the processor is further configured to:
      detect an establishment of a connection between the electronic device and a communication device via the radio-frequency identification communication system; and
      receive, via the radio-frequency identification communication system, the unique identifier associated with the communication.

10. A communication device, comprising:
    a storage device;
    a communication system; and a processor communicatively coupled to the storage device and the communications system, wherein the processor is configured to:

receive, via a link account interface, a request to link the communication device with an account on an account management server associated with an electronic device, the electronic device being a different device than the communication device;

automatically request, via the communication system, identifying information associated with the electronic device from the electronic device upon receipt of the request to link the communication device with the account on the account management server;

receive, via the communication system, the identifying information associated with the electronic device from the electronic device and store the identifying information for the electronic device in the storage device; and request, upon receipt of the identifying information associated with the electronic device from the electronic device, generation of a new account on an account management server associated with the electronic device without substantial user input and request management access for the new account for a user of the communication device by transmitting the identifying information to the account management server.

11. The communication device of claim 10, wherein the identifying information includes an internet protocol address.

12. The communication device of claim 11, wherein the identifying information further includes a unique identifier associated with the electronic device.

13. The communication device of claim 10, wherein the communication device is a cellular phone.

14. The communication device of claim 10, wherein the processor is further configured to transmit, via the communication system, a unique identifier associated with the communication device to the electronic device.

15. The communication device of claim 14, wherein the processor is further configured to request access to the account on the account management server by transmitting the identifying information and the unique identifier associated with the communication device to the account management server.

* * * * *